United States Patent
Kim et al.

(10) Patent No.: US 12,109,872 B2
(45) Date of Patent: Oct. 8, 2024

(54) DOOR ARMREST STRUCTURE OF VEHICLE

(71) Applicants: Hyundai Motor Company, Seoul (KR); Kia Corporation, Seoul (KR)

(72) Inventors: Dowon Kim, Seoul (KR); Jaeseung Lee, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 72 days.

(21) Appl. No.: 17/977,731

(22) Filed: Oct. 31, 2022

(65) Prior Publication Data
US 2023/0219403 A1    Jul. 13, 2023

(30) Foreign Application Priority Data
Jan. 13, 2022 (KR) .................. 10-2022-0005423

(51) Int. Cl.
*B60J 5/04*      (2006.01)
*B60R 13/02*    (2006.01)

(52) U.S. Cl.
CPC ......... *B60J 5/0493* (2013.01); *B60R 13/0243* (2013.01); *B60R 13/0237* (2013.01); *B60R 2013/0287* (2013.01)

(58) Field of Classification Search
CPC .... B60N 2/753; B60N 2/793; B60R 13/0243; B60R 13/0237; B60R 2013/0287; B60J 5/0493
USPC ..................... 296/1.09, 37.15, 153
See application file for complete search history.

(56) References Cited

U.S. PATENT DOCUMENTS

| | | | | |
|---|---|---|---|---|
| 5,527,084 A | * | 6/1996 | Scherf ................ | B60R 21/0428 296/187.05 |
| 5,816,645 A | * | 10/1998 | Grimes ................ | B60N 2/914 296/153 |
| 5,967,594 A | * | 10/1999 | Ramanujam ............ | B60N 2/78 280/751 |

(Continued)

FOREIGN PATENT DOCUMENTS

| | | | | |
|---|---|---|---|---|
| DE | 102008036565 A1 | * | 4/2010 | ......... B60R 13/0243 |
| DE | 102013204170 B3 | * | 3/2014 | ............ B60N 2/466 |
| FR | 3099442 A1 | * | 2/2021 | ............... B60N 2/78 |

OTHER PUBLICATIONS

Machine Translation of DE102013204170 (Year: 2024).*
Machine Translation of FR3099442 (Year: 2024).*

*Primary Examiner* — Jason S Morrow
(74) *Attorney, Agent, or Firm* — Morgan, Lewis & Bockius LLP (57) ABSTRACT

A door armrest structure of a vehicle includes: an armrest pivot rotatably coupled to the door internal panel and extending in a direction parallel to the door internal panel; a trim cover including a first end portion connected to the armrest pivot and operating to be rotated around the armrest pivot according to rotation of the armrest pivot; an armrest including an end portion attached to the trim cover and operating to deploy and return according to operation of the trim cover; a drive motor operating to rotate the armrest pivot according to an opening signal or a closing signal of the door; and a telescoping rod including first end portion connected to the drive motor and the other end portion passing through the armrest to be fixed to the trim cover, and moving back and forth to pivot the trim cover according to operation of the drive motor.

12 Claims, 13 Drawing Sheets

(56) References Cited

U.S. PATENT DOCUMENTS

| | | | |
|---|---|---|---|
| 9,180,830 B1* | 11/2015 | Faruque | B60R 21/0428 |
| 9,238,440 B1* | 1/2016 | Bowser | B60R 7/046 |
| 10,259,367 B2* | 4/2019 | Han | B60R 13/0243 |
| 10,427,577 B2* | 10/2019 | Sequi | B60N 3/002 |
| 2017/0313229 A1* | 11/2017 | Isernio | B60N 2/78 |
| 2023/0038501 A1* | 2/2023 | Kim | B60N 2/78 |

* cited by examiner

DOOR ARMREST STRUCTURE OF VEHICLE

CROSS-REFERENCE TO RELATED APPLICATION

The present application claims priority to Korean Patent Application No. 10-2022-0005423 filed on Jan. 13, 2022, the entire contents of which is incorporated herein for all purposes by this reference.

BACKGROUND OF THE PRESENT DISCLOSURE

Field of the Present Disclosure

The present disclosure relates to a door armrest structure of a vehicle. More particularly, the present disclosure relates to a door armrest structure configured for supporting an arm of an occupant inside a vehicle having a sliding door structure.

Description of Related Art

In general, a vehicle has a vehicle compartment having a predetermined size capable of accommodating a driver and a fellow rider, and a vehicle compartment opening/closing door is provided in the vehicle body to open or close the vehicle compartment.

In the case of a passenger vehicle, the vehicle compartment opening/closing door includes a front door provided in the front in the longitudinal direction of the vehicle and a rear door provided in the rear in the longitudinal direction of the vehicle, and the front door and the rear door are usually rotatably provided in the vehicle body by hinges.

In the case of a van which may accommodate many people, the vehicle compartment opening/closing door slides back and forth in the longitudinal direction of the vehicle to open or close the vehicle compartment.

In the sliding-type vehicle compartment opening/closing door of the van, the vehicle compartment opening/closing door moves rearward in the longitudinal direction of the vehicle to open the vehicle compartment, and moves forward in the longitudinal direction of the vehicle to close the vehicle compartment. Therefore, it is advantageous in that the opening/closing space required for opening and closing the door is smaller than that of the hinge-type vehicle compartment opening/closing door such as the passenger vehicle, and the door opening formed in the vehicle body may be completely opened even in a narrow opening/closing space.

Figure 1:
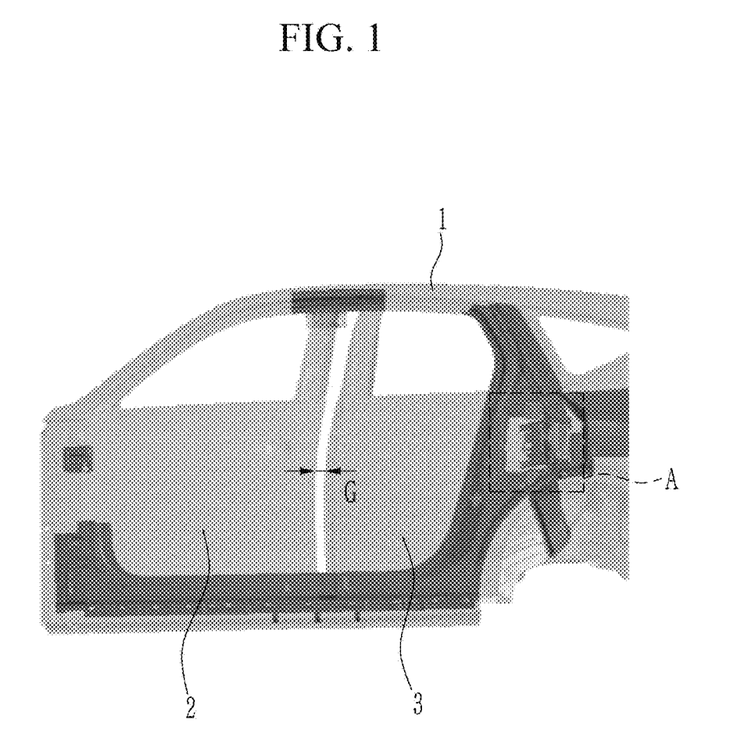
FIG. 1 is a side view showing a vehicle including a conventional sliding compartment opening/closing door.
Figure 2:
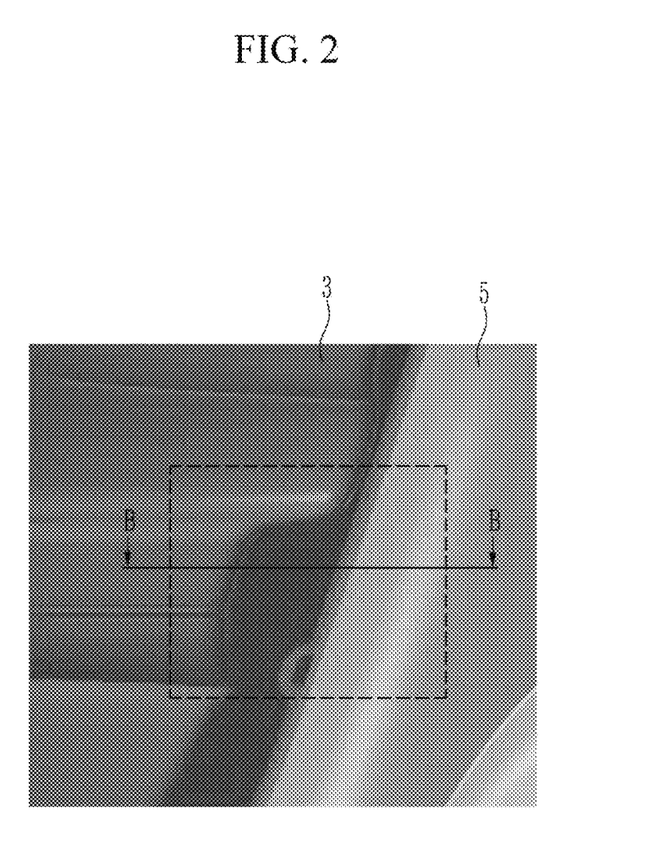
FIG. 2 is an enlarged view showing a part 'A', which is a vehicle hinge coupling portion of FIG. 1.

On the other hand, the door of the vehicle is provided with a door armrest for supporting the arm of the occupant. However, as shown in FIG. 1, in the vehicle including sliding compartment opening/closing doors 2 and 3 on a vehicle body 1, it is difficult to secure the space occupied by the door armrest on the rear door 3 side to secure the swing gap G. FIG. 2 is an enlarged view showing a part 'A', which is a vehicle hinge coupling portion of FIG. 1, and FIG. 3 is a cross-sectional view cut along a line 'B-B' of FIG. 2.

Figure 3:
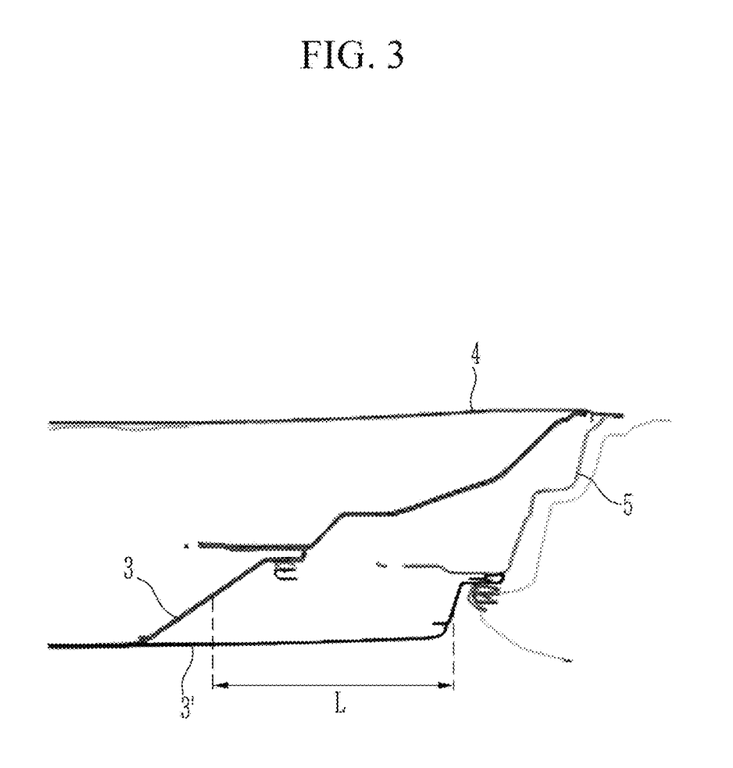
FIG. 3 is a cross-sectional view taken along a line 'B-B' of FIG. 2.

As shown in FIG. 2 and FIG. 3, in a case of the hinge-type compartment opening/closing door, in the space between the rear door 3 and the luggage trim 5, as there is no choice but to reduce an existing armrest length space to produce a smaller length space to avoid interference when opening the door, the space is reduced by an 'L' length compared to an existing one. In the instant case, there is a problem that usability deteriorates because it is difficult for the occupant to secure an armrest space to support the arm.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a corrugated-type door armrest structure which may function as an armrest as a shape is changed according to the opening/closing of the door in the hinge-type compartment opening/closing door.

A door armrest structure of a vehicle according to various exemplary embodiments of the present disclosure as a door armrest structure provided to a door internal panel configuring a door for opening/closing a door opening formed in a vehicle body and a door trim covering the door internal panel, includes: an armrest pivot rotatably coupled to the door internal panel and extending in a direction parallel to the door internal panel; a trim cover including a first end portion connected to the armrest pivot and operating to be rotated around the armrest pivot according to rotation of the armrest pivot; an armrest including an end portion attached to the trim cover and operating to deploy and return according to operation of the trim cover; a drive motor operating to rotate the armrest pivot according to an opening signal or a closing signal of the door; and a telescoping rod including first end portion connected to the drive motor and the other end portion passing through the armrest to be fixed to the trim cover, and moving back and forth to pivot the trim cover according to operation of the drive motor.

The trim cover may operate so that a surface of the trim cover turns closer to the door trim when the door is opened.

The trim cover may operate so that the surface of the trim cover turns away from the door trim when the door is closed.

The telescoping rod may operate so that a length thereof becomes shorter toward the front of the vehicle body while the other end portion of the telescoping rod pulls the trim cover when the door is opened.

The telescoping rod may operate so that the length becomes longer toward the rear of the vehicle body while the other end portion of the telescoping rod pushes the trim cover when the door is closed.

The armrest may be formed in a shape in which a plurality of plates are disposed side by side in the longitudinal direction of the vehicle body and one end portion of each plate is connected to the armrest pivot.

A plurality of plates may be formed of a paper material.

A penetration hole may be provided in the center portion of a plurality of plates and the trim cover, and an end portion of the telescoping rod provided in the other end portion of the telescoping rod may be disposed on the penetration hole to be penetrated.

The end portion of the telescoping rod end portion may be thread-coupled with the telescoping rod cap, a trim cover holding portion may be located between the end portion of the telescoping rod and the telescoping rod, and the trim cover may be fixed between the telescoping rod end portion and the trim cover holding portion through the penetration hole.

The first end portion of the telescoping rod may be thread-coupled with a rotation axis of the drive motor.

The upper end portion of the armrest may be provided with a supporting portion on which the arm of the occupant is supported.

The supporting portion may be formed to expand and contract according to a deployment and return of the armrest.

According to various exemplary embodiments of the present disclosure, by providing the corrugated-type door armrest structure that functions as the rear seat armrest when the door is closed in the folded state in the door opening/closing process on the hinge-type compartment opening/closing door, the usability may be greatly improved.

Furthermore, it is possible to prevent the interference in the sliding opening/closing process of the door from occurring while solving the problem of difficulty in securing the space occupied by the door armrest on the rear door side, reducing a cost and improving a freedom degree of the layout.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

Furthermore, in embodiments, because like reference numerals designate like elements having the same configuration, various exemplary embodiments are representatively described, and in other exemplary embodiments of the present disclosure, only configurations that are different from the various exemplary embodiments will be described.

The drawings are schematic, and are not illustrated in accordance with a scale. Relative dimensions and ratios of portions in the drawings are illustrated to be exaggerated or reduced in size for clarity and convenience, and the dimensions are just examples and are not limiting. Furthermore, like structures, elements, or components illustrated in two or more drawings use same reference numerals for showing similar features. It will be understood that when an element such as a layer, film, region, or substrate is referred to as being "on" another element, it can be directly on the other element or intervening elements may also be present.

Various exemplary embodiments of the present disclosure represents in detail various exemplary embodiments of the present disclosure. As a result, various modifications of the drawings will be expected. Therefore, the exemplary embodiment of the present disclosure is not limited to a specific aspect of the illustrated region, and for example, includes modifications of an aspect by manufacturing.

Now, a door armrest structure of a vehicle according to various exemplary embodiments of the present disclosure will be described with reference to appended drawings.

Figure 4:
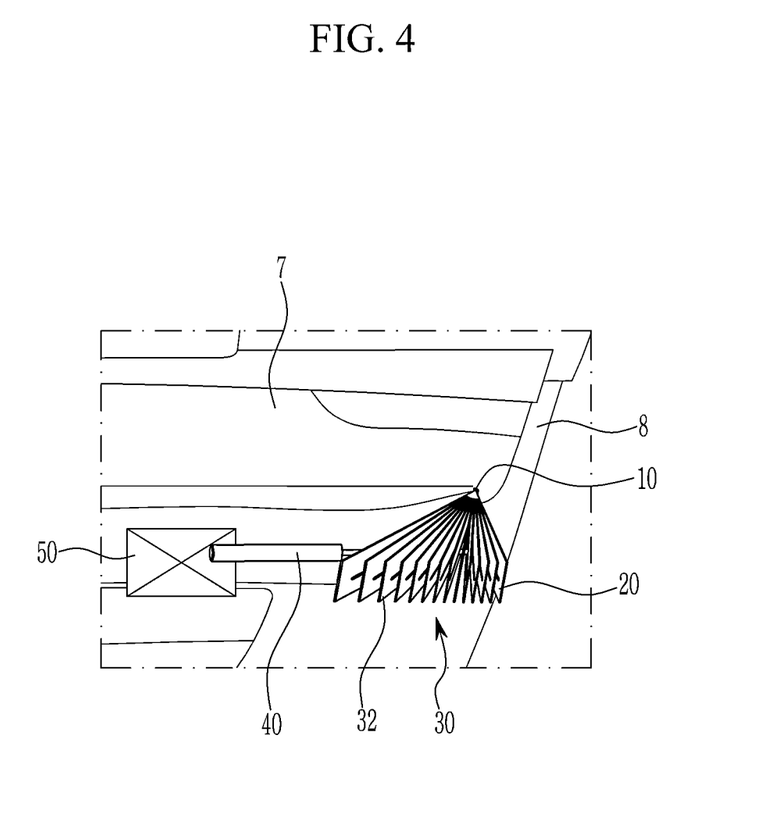
FIG. 4 is a schematic view showing a door armrest structure of a vehicle according to various exemplary embodiments of the present disclosure.

Referring to FIG. 4, the door armrest structure of the vehicle according to various exemplary embodiments of the present disclosure may be applied to the internal side of the rear door provided at the rear in the longitudinal direction of the vehicle, and may be applied to the structure in which the rear door is opened or closed by the movement in the inside and outside directions of the vehicle and the forwards and backwards sliding movement in the longitudinal direction of the vehicle.

Furthermore, the door armrest structure of the vehicle according to various exemplary embodiments of the present disclosure may be provided over a door internal panel 7 forming the rear door for opening/closing the door opening formed on the vehicle body and a door trim 8 covering the door internal panel 7.

Referring to FIG. 4, the door armrest structure of the vehicle according to various exemplary embodiments of the present disclosure includes an armrest pivot 10, a trim cover 20, an armrest 30, a drive motor 50, and a telescoping rod 40.

The armrest pivot 10 is rotatably fixed to the door internal panel 7 and extends in the vertical direction parallel to the door internal panel 7. That is, the armrest pivot 10 may be rotated to rotate the trim cover 20 and the armrest 30 provided on the armrest pivot 10 surface in the rotation direction of the rear door.

The trim cover 20 may be provided so that one end portion thereof is connected to the armrest pivot 10, and pivots around the armrest pivot 10 according to the rotation of the armrest pivot 10. The front end portion of the trim cover 20 is provided with an armrest 30 that operates to deploy and return according to the turning operation of the trim cover 20.

The armrest 30 may be in a form in which a plurality of plates 32 are disposed side by side in the longitudinal direction of the vehicle body, and one end portion of the plate 32 is connected to the armrest pivot 10. That is, one end portion of a plurality of plates 32 and one end portion of the trim cover 20 are connected to the armrest pivot 10, and the operation of folding and unfolding a plurality of plates 32 and the trim cover 20 according to the turning operation of the trim cover 20 may be performed.

A plurality of plates 32 may be made of a paper material. Therefore, it may have a thin thickness when the trim cover 20 and the armrest 30 are folded and flattened.

The drive motor 50 may be operated to rotate the armrest pivot 10 according to the opening/closing signal of the door. For this, the drive motor 50 and the trim cover 20 may be connected by the telescoping rod 40.

As for the telescoping rod 40, one end portion thereof is connected to the drive motor 50, and the other end portion thereof is fixed to the trim cover 20, so that the telescoping rod 40 may be moved back and forth according to the operation of the drive motor 50. The other end portion of telescoping rod 40 is fixed to the other end portion of the trim cover 20, as the other end portion of telescoping rod 40 moves back and forth, the other end portion of the trim cover 20 moves back and forth, one end portion of the trim cover 20 fixed to the armrest pivot 10 is rotated around the armrest pivot 10.

Figure 5:
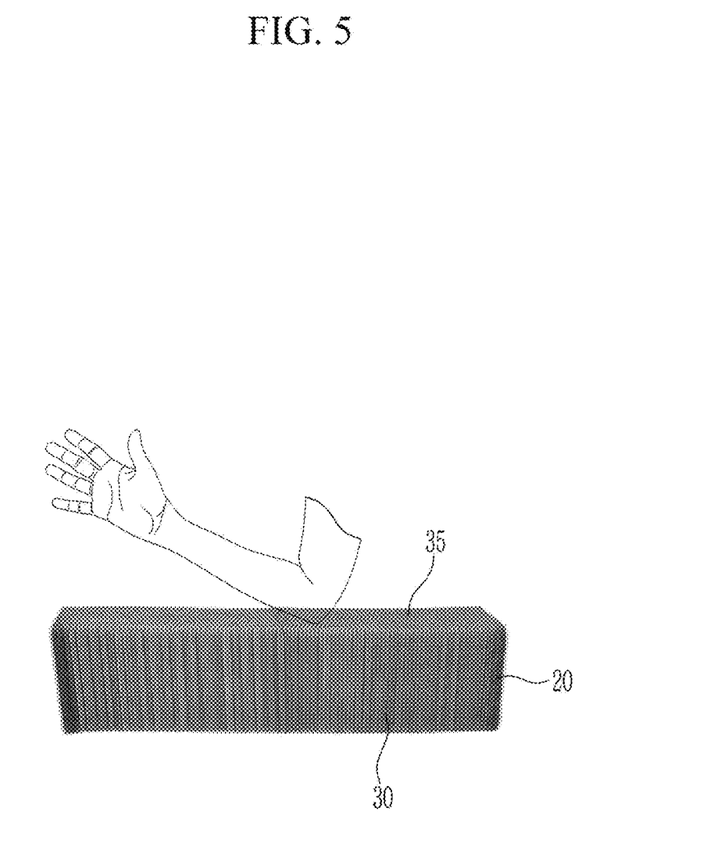
FIG. 5 is a view showing a corrugated-type door armrest according to various exemplary embodiments of the present disclosure.
Figure 6A:
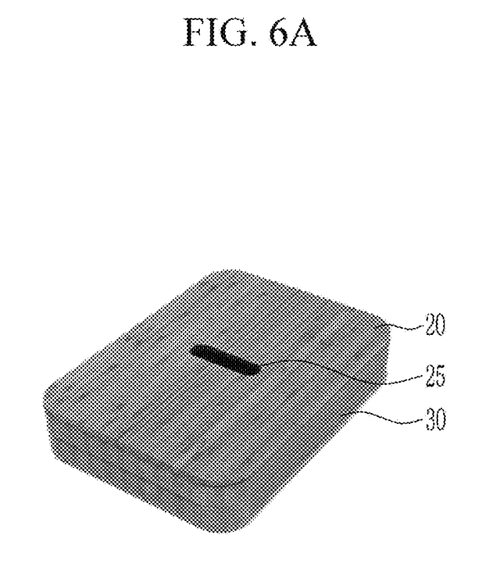
FIG. 6A, FIG. 6B and FIG. 6C are views showing states of a shape change of a corrugated-type door armrest according to various exemplary embodiments of the present disclosure.
Figure 6B:
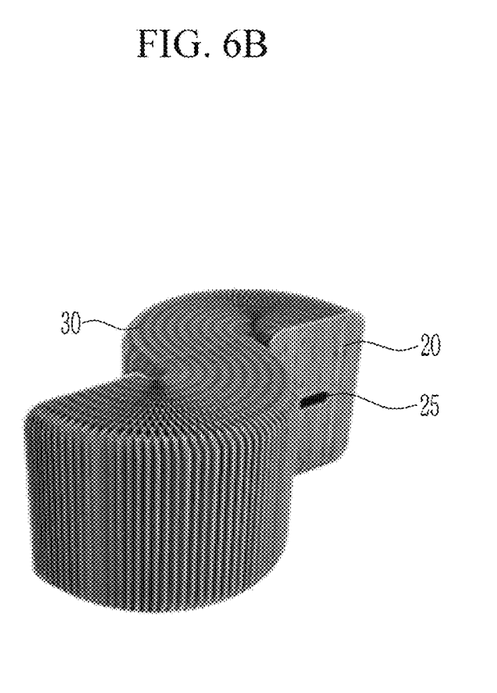
Figure 6C:
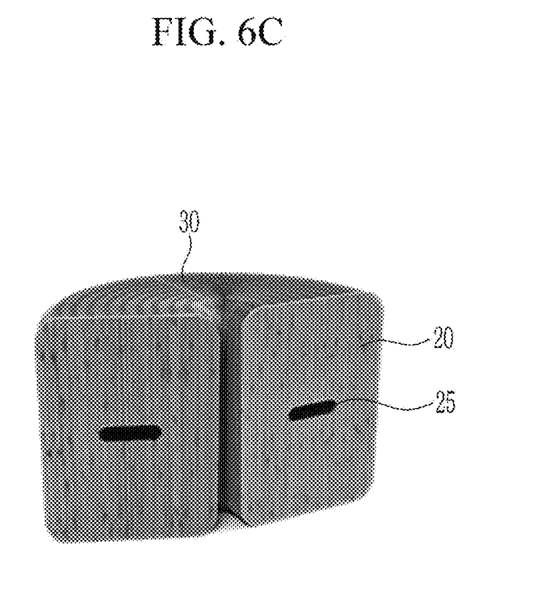

FIG. 5 is a view showing a corrugated-type door armrest according to various exemplary embodiments of the present disclosure, and FIG. 6A, FIG. 6B and FIG. 6C are views showing states of a shape change of a corrugated-type door armrest according to various exemplary embodiments of the present disclosure.

Referring to FIG. 5 and FIG. 6, the corrugated-type door armrest 30 applied to the door armrest structure of the vehicle according to various exemplary embodiments of the present disclosure may be in a form in which the trim covers 20 face each other on both sides with a plurality of plates 32 of a square shape between them. A plurality of plates 32 may be a structure in which they are connected to each other, and the position and the shape of a plurality of plates 32 may be changed according to a change in the position of the trim cover 20. As shown in FIG. 6A, FIG. 6B and FIG. 6C, the armrest 30 may be changed into various shapes such as a folded and flattened state in FIG. 6A, an 'S' shape in FIG. 6B, and a half donut shape in FIG. 6C depending on the position of the trim cover 20.

A penetration hole 25 may be formed in the center portion of the trim cover 20 and the plurality of plates 32. The telescoping rod 40 is provided to penetrate into the penetration hole 25 and the telescoping rod end portion 42 provided at the other end portion of the telescoping rod 40 may be connected to the trim cover 20, and the trim cover 20 on the telescoping rod end portion side may be moved back and forth according to the front and rear movement of the telescoping rod 40.

On the other hand, the upper end portion of the armrest 30, that is, the upper end portion of a plurality of plates 32, may be provided with a supporting portion 35 configured for supporting the arm of the occupant, and may be formed to expand and contract according to the deployment and return of the armrest 30.

Figure 7A:
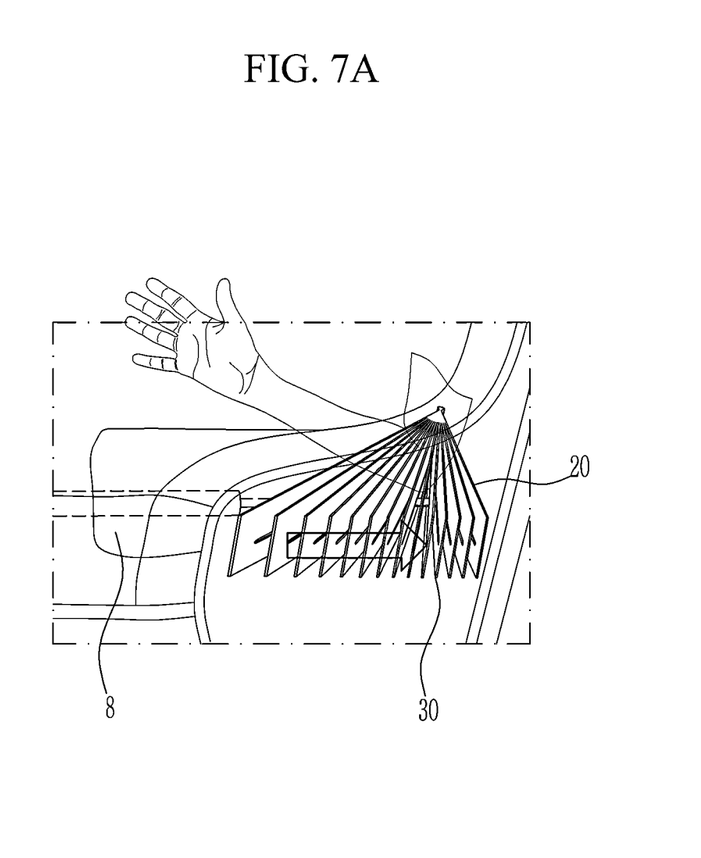
FIG. 7A and FIG. 7B are views showing a state in a process of a door closing and a door opening/closing of a door armrest structure of a vehicle according to various exemplary embodiments of the present disclosure.
Figure 7B:
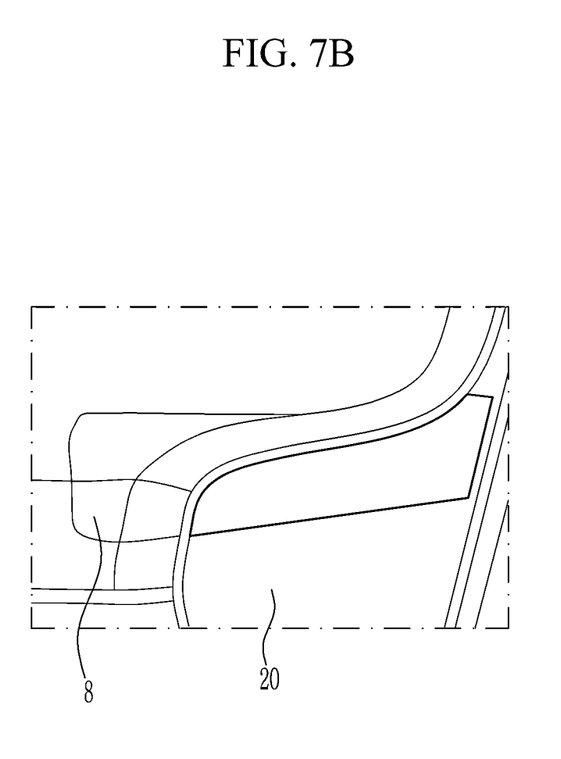

FIG. 7A and FIG. 7B are views showing a state in a process of a door closing and a door opening/closing of a door armrest structure of a vehicle according to various exemplary embodiments of the present disclosure.

Referring to FIGS. 7A and 7B, the trim cover 20 may be operated so that the surface of the trim cover 20 turns away from the door trim 8 when the door is closed in FIG. 7A. At the instant time, according to the door closing signal, the drive motor 50 operates so that the telescoping rod 40 becomes longer toward the rear of the vehicle, and the other end portion of the telescoping rod 40 pushes the trim cover 20 and the armrest 30 is unfolded. In the state in which the armrest 30 is unfolded, the occupant may rest their arm on the armrest 30.

In a process of opening the door, the trim cover 20 may be operated so that the surface of the trim cover 20 turns closer to the door trim 8 in FIG. 7B. According to the door open signal, the drive motor 50 operates so that the telescoping rod 40 becomes shorter toward the front of the vehicle, and the armrest 30 is folded while the other end portion of the telescoping rod 40 pulls the trim cover 20. In the instant case, while the trim cover 20 is in close contact with the door trim 8, it may be possible to prevent interference from occurring during the sliding opening/closing process of the door.

In an exemplary embodiment of the present invention, the telescoping rod 40 is telescopic rods, one of which is connected to the drive motor 50 and another of which is connected to the trim cover 20 or a single rod connected to the drive motor 50 and the trim cover 20.

Figure 8:
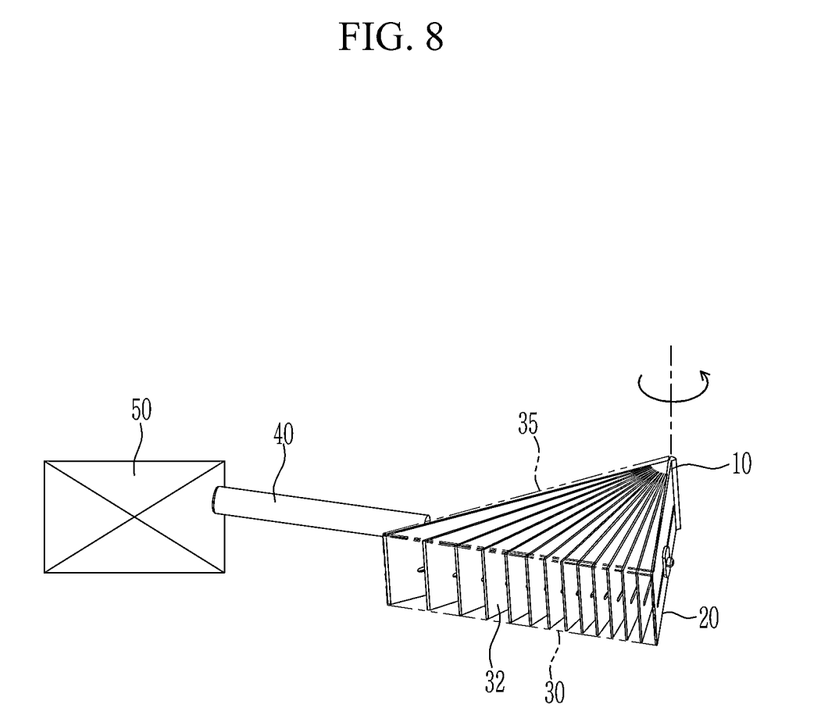
FIG. 8 is a view showing a connection structure of a drive motor, a telescoping rod, and an armrest in a door armrest structure of a vehicle according to various exemplary embodiments of the present disclosure.
Figure 9:
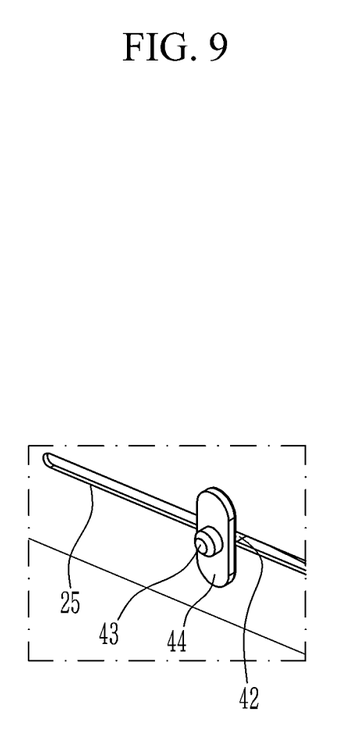
FIG. 9 is a view showing a coupling state of a telescoping rod and a trim cover in a door armrest structure of a vehicle according to various exemplary embodiments of the present disclosure.
Figure 10:
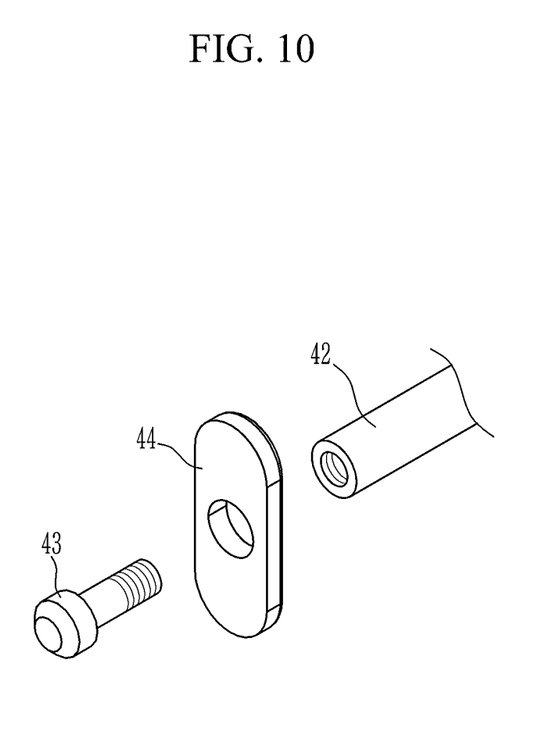
FIG. 10 is a view showing a coupling state of a telescoping rod cap and a telescoping rod end portion of a trim cover holding portion of a door armrest structure of a vehicle according to various exemplary embodiments of the present disclosure.

FIG. 8 is a view showing a connection structure of a drive motor, a telescoping rod, and an armrest in a door armrest structure of a vehicle according to various exemplary embodiments of the present disclosure, FIG. 9 is a view showing a coupling state of a telescoping rod and a trim cover in a door armrest structure of a vehicle according to various exemplary embodiments of the present disclosure, and FIG. 10 is a view showing a coupling state of a telescoping rod cap and a telescoping rod end portion of a trim cover holding portion of a door armrest structure of a vehicle according to various exemplary embodiments of the present disclosure.

Referring to FIG. 8, FIG. 9 and FIG. 10, one end portion of telescoping rod 40 is connected to the drive motor 50, and the other end portion thereof is connected to the trim cover 20.

A penetration hole 25 may be provided in a center portion of a plurality of plates 32 and the trim cover 20, and the telescoping rod end portion 42 provided in the other end portion of the telescoping rod 40 may be disposed to pass through the penetration hole 25. The telescoping rod end portion 42 may be connected and fixed to the penetration hole 25 of the trim cover 20 by passing through the penetration hole formed in the plurality of plates 32.

The end portion of the telescoping rod end portion 42 may be thread-coupled with the telescoping rod cap 43, and the trim cover holding portion 44 may be located between the end portion of the telescoping rod end portion 42 and the telescoping rod cap 43.

The trim cover 20 may be fixed between the telescoping rod end portion 42 and the trim cover holding portion 44 through the penetration hole 25. When the telescoping rod 40 is operated to be shortened toward the front of the vehicle by the drive motor 50, the trim cover holding portion 44 may pull the trim cover 20 to be in close contact with the door trim 8.

On the other hand, one end portion of the telescoping rod 40 may be thread-coupled with a rotation axis of the drive motor 50. When an external force is applied to the front of the vehicle on the trim cover 20 regardless of the door opening/closing signal, the shortening of the telescoping rod 40 may be prevented by the thread-coupling of one end portion of the telescoping rod 40 with the of the drive motor 50 rotation axis.

Accordingly, according to various exemplary embodiments of the present disclosure, by providing the corrugated-type door armrest structure that functions as the rear seat armrest when the door is closed in the folded state in the door opening/closing process on the hinge-type compartment opening/closing door, the usability may be greatly improved.

Furthermore, it is possible to prevent the interference in the sliding opening/closing process of the door from occurring while solving the problem of difficulty in securing the space occupied by the door armrest on the rear door side, reducing a cost and improving a freedom degree of the layout.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door armrest structure of a vehicle as a door armrest structure provided to a door internal panel configuring a door for opening/closing a door opening formed in a vehicle body and a door trim covering the door internal panel, the door armrest structure comprising:

an armrest pivot rotatably coupled to the door internal panel and extending in a direction parallel to the door internal panel;
a trim cover including a first end portion connected to the armrest pivot and operating to be rotated around the armrest pivot according to rotation of the armrest pivot;
an armrest including an end portion attached to the trim cover and operating to deploy and return according to operation of the trim cover;
a drive motor operating to rotate the armrest pivot according to an opening signal or a closing signal of the door; and
a telescoping rod including a first end portion connected to the drive motor and a second end portion passing through the armrest to be fixed to a second end portion of the trim cover, and moving back and forth to pivot the trim cover according to operation of the drive motor.

2. The door armrest structure of claim 1,
wherein the trim cover operates so that a surface of the trim cover turns closer to the door trim when the door is opened.

3. The door armrest structure of claim 1,
wherein the trim cover operates so that a surface of the trim cover pivots away from the door trim when the door is closed.

4. The door armrest structure of claim 1,
wherein the telescoping rod operates so that a length thereof becomes shorter toward the front of the vehicle body while the second end portion of the telescoping rod pulls the trim cover when the door is opened.

5. The door armrest structure of claim 1,
wherein the telescoping rod operates so that a length thereof becomes longer toward the rear of the vehicle body while the second end portion of the telescoping rod pushes the trim cover when the door is closed.

6. The door armrest structure of claim 1,
wherein the armrest is formed in a shape in which a plurality of plates are disposed side by side in a longitudinal direction of the vehicle body and one end portion of each plate is connected to the armrest pivot.

7. The door armrest structure of claim 6,
wherein the plurality of plates are formed of a paper material.

8. The door armrest structure of claim 6,
wherein a penetration hole is provided in a center portion of the plates and the trim cover, and a telescoping rod end portion of the telescoping rod provided in the second end portion of the telescoping rod is disposed in the penetration hole to penetrate the plates and the trim cover.

9. The door armrest structure of claim 8,
wherein an end portion of the telescoping rod end portion is thread-coupled with a telescoping rod cap,
wherein a trim cover holding portion is located between the end portion of the telescoping rod end portion and the telescoping rod, and
wherein the trim cover is fixed between the telescoping rod end portion and the trim cover holding portion through the penetration hole.

10. The door armrest structure of claim 1,
wherein the first end portion of the telescoping rod is thread-coupled with a rotation axis of the drive motor.

11. The door armrest structure of claim 1,
wherein an upper end portion of the armrest is provided with a supporting portion so that an arm of an occupant is supported on the supporting portion.

12. The door armrest structure of claim 11,
wherein the supporting portion is formed to expand and contract according to deployment and return of the armrest.

\* \* \* \* \*